US008982712B2

United States Patent
Liu

(10) Patent No.: US 8,982,712 B2
(45) Date of Patent: Mar. 17, 2015

(54) DE-MAPPING METHOD AND DEVICE FOR OPTICAL TRANSPORT UNIT FRAME

(75) Inventor: Xilin Liu, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 135 days.

(21) Appl. No.: 13/702,693

(22) PCT Filed: Oct. 26, 2010

(86) PCT No.: PCT/CN2010/078132
§ 371 (c)(1),
(2), (4) Date: Dec. 7, 2012

(87) PCT Pub. No.: WO2011/153781
PCT Pub. Date: Dec. 15, 2011

(65) Prior Publication Data
US 2013/0077959 A1    Mar. 28, 2013

(30) Foreign Application Priority Data

Jun. 8, 2010    (CN) .......................... 2010 1 0203103

(51) Int. Cl.
*H04L 1/00*    (2006.01)
*H04L 12/26*    (2006.01)
(Continued)

(52) U.S. Cl.
CPC .............. *H04B 10/27* (2013.01); *H04J 3/1652* (2013.01); *H04B 10/03* (2013.01)
USPC ............. 370/242; 370/252; 370/470; 398/17; 398/25

(58) Field of Classification Search
CPC ..... H04J 3/1652; H04J 3/1611; H04J 3/0647; H04J 3/0623; H04J 3/167; H04J 2203/0089; H04B 2210/071

USPC ....................... 370/474, 252, 470; 398/17, 25
See application file for complete search history.

(56) References Cited

U.S. PATENT DOCUMENTS 8,170,421 B2 * 5/2012 Li ................................. 398/154
2004/0105456 A1 * 6/2004 Lanzone et al. .............. 370/429
(Continued)

FOREIGN PATENT DOCUMENTS

CN    1984018 A    6/2007
CN    101350691 A   1/2009
(Continued)

OTHER PUBLICATIONS

Internationl Search Report for International Application No. PCT/CN2010/078132 mailed Mar. 17, 2011.

*Primary Examiner* — Alpus H Hsu
*Assistant Examiner* — Elton Williams
(74) *Attorney, Agent, or Firm* — Pearl Cohen Zedek Latzer Baratz LLP

(57) ABSTRACT

The disclosure discloses a de-mapping method and a device for an Optical Transport Unit (OTU) frame. The method includes: setting a receiving reference clock and a de-mapping path according to a highest priority of an OTU frame mapping mode of a local device (S102); receiving an OTU frame of an opposite device by using the receiving reference clock and the de-mapping path (S104); determining a de-mapping priority of the OTU frame according to a clock recovery result of the received OTU frame and a customer service alarm instruction (S106); and de-mapping the OTU frame of the opposite device by using a receiving reference clock and a de-mapping path corresponding to the determined de-mapping priority of the OTU frame (S108). By means of the present invention, the de-mapping efficiency and accuracy of the OTU frame in an optical transport network are improved.

6 Claims, 6 Drawing Sheets

(51) Int. Cl.
*H04J 3/16* (2006.01)
*H04J 3/22* (2006.01)
*H04B 10/08* (2006.01)
*H04B 17/00* (2006.01)
*H04B 10/27* (2013.01)
*H04B 10/03* (2013.01)

(56) References Cited

U.S. PATENT DOCUMENTS

| | | | |
|---|---|---|---|
| 2005/0068995 A1* | 3/2005 | Lahav et al. | 370/539 |
| 2007/0248121 A1* | 10/2007 | Zou | 370/498 |
| 2007/0264025 A1* | 11/2007 | Fifer | 398/155 |
| 2008/0273473 A1* | 11/2008 | Xu | 370/255 |
| 2009/0103926 A1* | 4/2009 | Hotchkiss et al. | 398/135 |
| 2009/0324215 A1* | 12/2009 | Yin | 398/2 |
| 2010/0080245 A1* | 4/2010 | Kisaka et al. | 370/470 |
| 2011/0182580 A1* | 7/2011 | Yin | 398/58 |

FOREIGN PATENT DOCUMENTS

| | | |
|---|---|---|
| CN | 101378399 A | 3/2009 |
| CN | 101702637 A | 5/2010 |
| CN | 101848066 A | 9/2010 |

* cited by examiner

DE-MAPPING METHOD AND DEVICE FOR OPTICAL TRANSPORT UNIT FRAME

CROSS-REFERENCE TO RELATED APPLICATIONS

This application is a National Phase Application of PCT International Application No. PCT/CN2010/078132, International Filing Date Oct. 26, 2010, claiming priority of Chinese Patent Application No. 201010203103.X, filed Jun. 8, 2010 which is hereby incorporated by reference.

FIELD OF THE INVENTION

The disclosure relates to communication field, and in particular to a de-mapping method and a device for an Optical Transport Unit (OTU) frame.

BACKGROUND OF THE INVENTION

In an Optical Transport Network (OTN), various ways can be used for mapping the same kind of customer service signal into an OTU frame structure. The devices of the communication equipment manufacturer can select one or more mapping modes; when using the devices of different manufacturers or the devices with different model numbers of the same manufacturer to perform an access of customer service, the operator can use different data mapping methods even for the same customer service data.

For example, four mapping modes for mapping 10GE-LAN signal into OTU are introduced in the protocol GSup43 of the International Telecommunications Union-Telecommunications standardization sector (ITU-T), which are respectively 10GE->OTU2e, 10GE->OTU1e, 10GE->GFP->OTU2 non-pass-through preamble and 10GE->GFP->OTU2 pass-through preamble.

In related art, the same customer service can be mapped into the OTN frame by several mapping modes. Because different equipment manufacturers can use different mapping modes to map the OTU frame, it is needed to manually configure the de-mapping mode in the process of de-mapping the OTU frame, the configuring process is complicated, and wrong configuration of the de-mapping mode will cause error of interconnection and communication of equipment, which further causes link interruption.

SUMMARY OF THE INVENTION

The disclosure mainly aims to provide a de-mapping method and a device for OTU frame, so as to solve the above problems.

According to an aspect of the disclosure, a de-mapping method for an OTU frame is provided.

The de-mapping method for OTU frame according to the disclosure comprises: setting a receiving reference clock and a de-mapping path according to a highest priority of an OTU frame mapping mode of a local device; receiving an OTU frame of an opposite device by using the receiving reference clock and the de-mapping path; determining a de-mapping priority of the OTU frame according to a clock recovery result of the received OTU frame and a customer service alarm instruction; and de-mapping the OTU frame of the opposite device by using a receiving reference clock and a de-mapping path corresponding to the determined de-mapping priority of the OTU frame.

After the step of determining the de-mapping priority of the OTU frame according to the clock recovery result of the received OTU frame and the customer service alarm instruction, the method further comprises: adjusting the priority of the OTU frame mapping mode of the local device as the determined de-mapping priority of the OTU frame.

The step of determining the de-mapping priority of the OTU frame according to the clock recovery result of the received OTU frame and the customer service alarm instruction comprises: judging whether the clock recovery result of the OTU frame is signal loss; and if the judgment result is no, obtaining the customer service alarm instruction of the OTU frame.

After the step of obtaining the customer service alarm instruction of the OTU frame, the method further comprises: if the customer service alarm instruction is a service failure alarm, increasing the de-mapping priority of the OTU frame by a level, and performing a clock recovery procedure according to a receiving reference clock corresponding to a de-mapping priority of the OTU frame which is increased by a level; and if the customer service alarm instruction is an expected alarm state of a client layer, determining that the current priority is the de-mapping priority of the OTU frame.

If the de-mapping priority of the OTU frame is greater than the sum of the mapping priority of the OTU frame, reperforming the de-mapping process.

According to another aspect of the disclosure, a de-mapping device for an OTU frame is provided.

The de-mapping device for an OTU frame according to the disclosure comprises: a setting module, configured to set a receiving reference clock and a de-mapping path according to a highest priority of an OTU frame mapping mode of a local device; a receiving module, configured to receive an OTU frame of an opposite device by using the receiving reference clock and the de-mapping path; a determining module, configured to determine a de-mapping priority of the OTU frame according to a clock recovery result of the received OTU frame and a customer service alarm instruction; and a de-mapping module, configured to de-map the OTU frame of the opposite device by using a receiving reference clock and a de-mapping path corresponding to the determined de-mapping priority of the OTU frame.

The device further comprises: an adjusting module, configured to adjust the priority of the OTU frame mapping mode of the local device as the determined de-mapping priority of the OTU frame.

The determining module comprises: an judging module, configured to judge whether the clock recovery result of the OTU frame is signal loss; and an obtaining module, configured to obtain the customer service alarm instruction of the OTU frame in the situation that the judgment result is no.

The determining module further comprises: a priority increasing module, configured to, if the customer service alarm instruction is a service failure alarm, increase the de-mapping priority of the OTU frame by a level; and a priority determining module, configured to, if the customer service alarm instruction is an expected alarm state of a client layer, determine that the current priority is the de-mapping priority of the OTU frame.

If the de-mapping priority of the OTU frame is greater than the sum of the mapping priority of the OTU frame, reperforming the de-mapping process.

By means of the disclosure, by the way of setting a receiving reference clock and a de-mapping path according to the highest priority of the OTU frame mapping mode of the local equipment, receiving an OTU frame of the opposite equipment by using the receiving reference clock and the de-mapping path, determining a de-mapping priority of the OTU frame according to the clock recovery result of the received OTU frame and the customer service alarm instruction, and de-mapping the OTU frame of the opposite equipment by using the receiving reference clock and the de-mapping path corresponding to the determined de-mapping priority of the OTU frame, the problems that because different equipment manufacturers may use different mapping modes to map the OTU frame, it is needed to manually configure the de-mapping mode in the process of de-mapping the OTU frame, the configuring process is complicated, and wrong configuration of the de-mapping mode will cause error of interconnection and communication of devices, which further causes link interruption are solved, and the de-mapping efficiency and accuracy of the OTU frame in the optical transport network are improved.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The preferred embodiments are described in conjunction with the drawings as follows. It shall be understood that the embodiments of the present application and the features of the embodiments can be combined with each other if there is no conflict.

Figure 1:
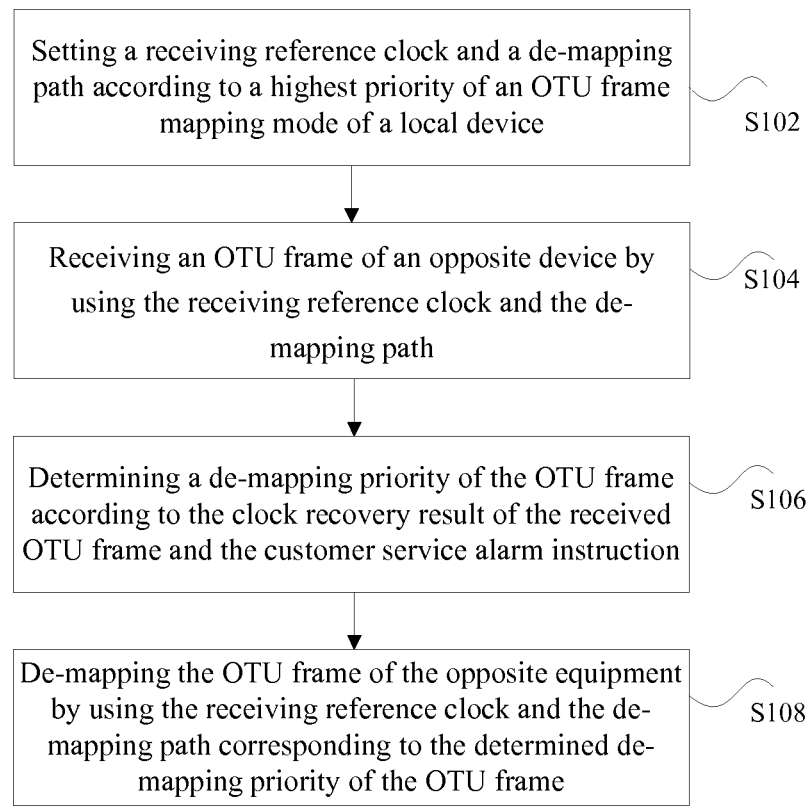
FIG. 1 is a flowchart of a de-mapping method for an OTU frame according to an embodiment of the disclosure.

The disclosure provides a de-mapping method for an OTN frame. As shown in FIG. 1, the method comprises the following steps S102 to S104.

Step S102: a receiving reference clock and a de-mapping path are set according to a highest priority of an OTU frame mapping mode of the local device.

Step S104: an OTU frame of an opposite device is received by using the receiving reference clock and the de-mapping path.

Step S106: a de-mapping priority of the OTU frame determined according to the clock recovery result of the received OTU frame and the customer service alarm instruction.

Step S108: perform a de-mapping the OTU frame of the opposite device by using the receiving reference clock and the de-mapping path corresponding to the determined de-mapping priority of the OTU frame.

In related art, in the process of de-mapping the OTU frame, it is necessary to configure a mapping reference clock and a de-mapping path corresponding to the OTU frame, which is complicated and error-prone. The embodiment improves the de-mapping efficiency and accuracy of the OTU frame in the optical transport network by means of de-mapping the OTU frame through the locally configured highest priority of the OTU frame mapping mode, and determining the mapping priority of the OTU frame through the result of clock recovery and customer service alarm instruction.

Preferably, the mapping configuration of the OTU frame in opposite sending direction in Step S104 can be the highest priority that the opposite device supports.

Preferably, after Step S106, the method further comprises: the priority of the OTU frame mapping mode of the local device is adjusted to be the determined de-mapping priority of the OTU frame.

It should be noted that, by configuring the mapping priority in sending direction according to the determined de-mapping priority in receiving direction, the preferred embodiment realizes the adaptive process of de-mapping and mapping priority.

Preferably, step S106 comprises: it is judged whether the clock recovery result of the OTU frame is signal loss, if the judgment result is no, the customer service alarm instruction of the OTU frame is obtained.

The clock recovery is a process of recovering clock from serial data, which can shorten the time of judging whether data is received correctly. Obtaining the customer service alarm instruction is a method for judging whether data is received correctly, which improves the accuracy of receiving data.

Preferably, after the step of obtaining the customer service alarm instruction of the OTU frame, the method further comprises: if the customer service alarm instruction is an expected alarm state of a client layer, the current priority is determined as the de-mapping priority of the OTU frame; if the customer service alarm instruction is a service failure alarm, the de-mapping priority of the OTU frame is increased by a level, and a clock recovery procedure is performed according to the receiving reference clock corresponding to a de-mapping priority of the OTU frame which is increased by a level.

The step of judging the alarm type and performing the operation of the priority of the OTU frame according to the judgment result obtains the priority of the OTU frame accurately, and improves the de-mapping efficiency and accuracy of the OTU frame in the optical transport network.

Preferably, if the de-mapping priority of the OTU frame is greater than the sum of the mapping priority of the OTU frame, the de-mapping process is reperformed. It should be noted that, if the determined de-mapping priority of the OTU frame is greater than the sum of the mapping priority of the OTU frame, it is indicated that the de-mapping of the OTU frame is not supported.

Figure 2:
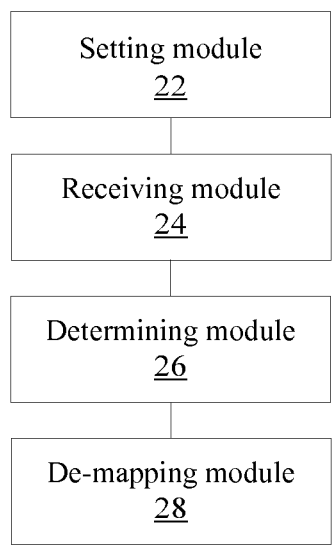
FIG. 2 is a structure diagram of a de-mapping device for an OTU frame according to an embodiment of the disclosure.

The disclosure provides a de-mapping device for an OTU frame. As shown in FIG. 2, the device comprises a setting module 22, a receiving module 24, a determining module 26 and a de-mapping module 28. The above structure will be described in details below.

the setting module 22 is configured to set a first receiving reference clock and a first de-mapping path according to a highest priority of an OTU frame mapping mode of the local device; the receiving module 24 is connected to the setting module 22, and is configured to receive an OTU frame of an opposite device by using the receiving reference clock and the de-mapping path set by the setting module 22; the determining module 26 is connected to the receiving module 24, and is configured to determine a de-mapping priority of the OTU frame according to a clock recovery result of the OTU frame received by the receiving module 24 and the customer service alarm instruction; the de-mapping module 28 is connected to the determining module 26, and is configured to de-map the OTU frame of the opposite device by using a receiving reference clock and a de-mapping path corresponding to the de-mapping priority of the OTU frame determined by the determining module 26.

Figure 3:
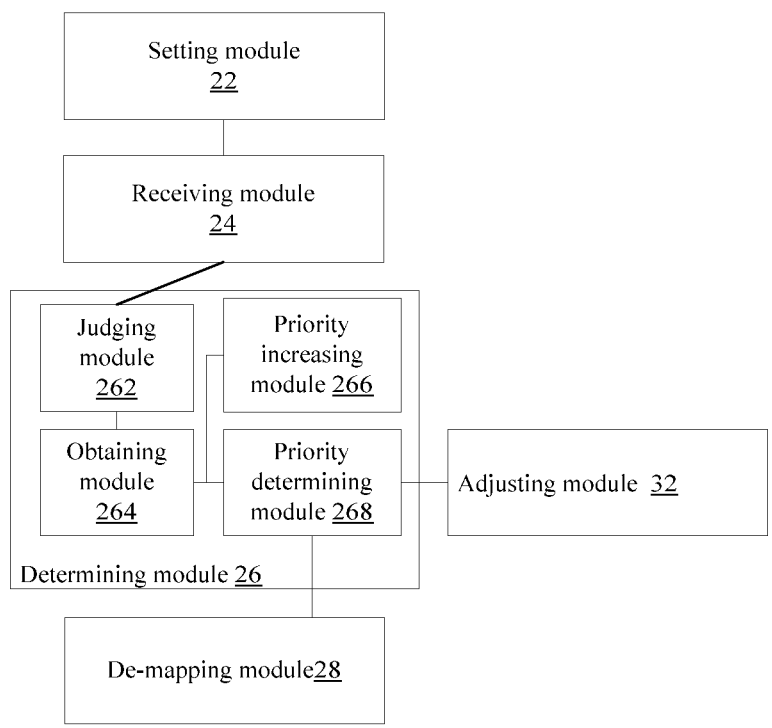
FIG. 3 is a preferred structure diagram of a de-mapping device for an OTU frame according to an embodiment of the disclosure.

FIG. 3 is a preferred structure diagram of a de-mapping device for an OTU frame according to an embodiment of the disclosure. As shown in FIG. 3, the device further comprises an adjusting module 32; the determining module 26 includes a judging module 262, an obtaining module 264, a priority increasing module 266 and a priority determining module 268; the above structure will be described in details below.

The adjusting module 32 is configured to adjust the priority of the OTU frame mapping mode of the local device as the determined de-mapping priority of the OTU frame.

The judging module 262 is configured to judge whether the clock recovery result of the OTU frame is signal loss; the obtaining module 264 is connected to the judging module 262, and is configured to obtain the customer service alarm instruction of the OTU frame in the situation that the judgment result of the judging module 262 is no; the priority increasing module 266 is connected to the obtaining module 264, and is configured to, if the customer service alarm instruction obtained by the obtaining module 264 is a service failure alarm, increase the de-mapping priority of the OTU frame by a level; the priority determining module 268 is connected to the obtaining module 264, and is configured to, if the customer service alarm obtained by the obtaining module 264 is an expected alarm state of a client layer, determine that the current priority is the de-mapping priority of the OTU frame.

To help understand the above embodiment, multiple other preferred embodiments of the disclosure are further described below.

Figure 4:
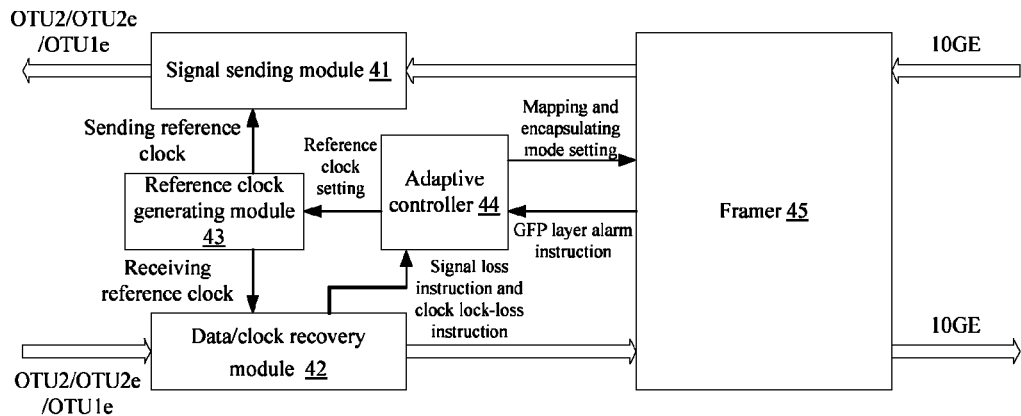
FIG. 4 is a structure diagram 1 according to a preferred embodiment of the disclosure.

FIG. 4 shows the structure diagram 1 according to a preferred embodiment of the disclosure. As shown in FIG. 4, a device comprises: a signal sending module 41, a data/clock recovery module 42, a reference clock generating module 43, an adaptive controller 44 and a framer 45; the above structure will be described in details below.

The signal sending module 41 is a path for service signal output, and can be configured as OTUkX, wherein k can be set to 1, 2, 3, 4 and so on, representing OTU1, OTU2, OTU3, OTU4; X can be e, f or null, representing OTUkx, OTUkf, OTUk and so on. OTU2, OTU2e or OTU1e are for bearing the 10GE-LAN client-side signal. The data/clock recovery module 42 is a path for service signal input, can be configured as OTUkX (ditto), and can output signal loss instruction and clock lock-loss instruction. The reference clock generating module 43 is a module for generating reference clock or training clock, and can provide training clock or reference clock needed by OTU2, OTU2e or OTU1e for the signal sending module 41 and the data/clock recovery module 42, respectively. The adaptive controller 44 takes charge of configuring the reference clock generating module 43 and the framer 45 according to the adaptive control method provided by the disclosure. The framer 45 sets signal mapping/de-mapping mode according to configuration of the adaptive controller 44, and provides the adaptive controller 44 with a GFP layer alarm instruction as the reference of control strategy.

It should be noted that, the embodiment is the device which performs de-mapping of the OTU frame in practice, the framer is configured to set the OTU frame de-mapping mode (set the reference clock signal and the de-mapping path), and to adjust the OTU frame mapping mode of the local device. The data/clock recovery module 42 is configured to output the clock recovery result, and to set the reference clock according to the set clock result.

Figure 5:
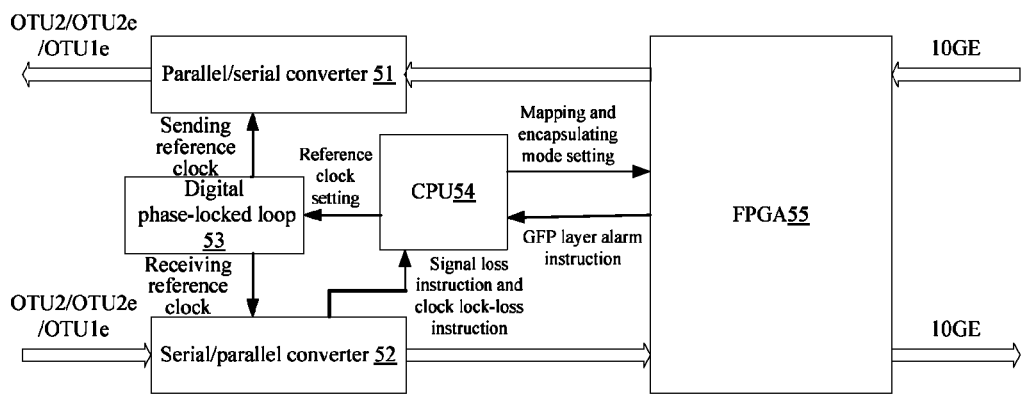
FIG. 5 is a structure diagram 2 according to a preferred embodiment of the disclosure.

FIG. 5 is a structure diagram 1 according to a preferred embodiment of the disclosure. FIG. 5 is an embodiment of a device of service mapping adaptation in the OTN. The embodiment is designed based on the structure diagram of FIG. 4 and referring to the situation of 10GE access, the structure is described below with reference to FIG. 5.

The device comprises: a parallel/serial converter 51, a serial/parallel converter 52, a digital phase-locked loop 53, a Central Processing Unit (CPU) 54 and a Field Programmable Gate Array (FPGA) 55.

An optical signal of the opposite device is accessed by the serial/parallel converter 52 of the device after photoelectric conversion. The serial/parallel converter 52 converts a serial signal to a parallel signal, recovers data and clock, and sends the data and the clock to the FPGA 55. In addition, the serial/parallel converter 52 detects a access signal, and provides the CPU 54 with a signal loss instruction and the receiving lock-loss instruction through IO pin or serial buses, such as SPI and IIC, wherein the generation of the receiving lock-loss instruction depends on the receiving reference clock provided by the digital phase-locked loop 53. A user-defined logic which supports one or more mapping modes from 10GE to OTU2/OTU2e/OTU1e runs on the FPGA 55. A mapping path is selected according to the configuration of the CPU 54, and the GFP layer alarm instruction is provided for the CPU 54, wherein the CPU and the FPGA can be connected through either CPU parallel data/address bus, or serial buses, such as SPI and IIC. The parallel/serial converter converts data obtained from the FPGA 55 to serial signal and sends the serial signal out according to a sending reference clock provided by the digital phase-locked loop 53. The digital phase-locked loop 53 includes two phase-locked loops, one of which provides a sending reference clock for the parallel/serial converter 51, and the other of which provides a receiving reference clock for the serial/parallel converter 52, and they are connected with the above two modules 51 and 52 through high-speed differential wires, wherein the reference clock provided by the digital phase-locked loop 53 is decided by the CPU 54, and the CPU 54 is connected with the digital phase-locked loop through serial buses, such as IIC or SPI.

It should be noted that, the embodiment is a structure diagram of hardware for implementing de-mapping function in practice, wherein the parallel/serial converter 51 is equal to the signal sending module 41 in FIG. 4, the serial/parallel converter 52 is equal to the data/clock recovery module 42 in FIG. 4, the digital phase-locked loop 53 is equal to the reference clock generating module 43, the CPU 54 is equal to the adaptive controller 44 in FIG. 4, and the FPGA 55 is equal to the framer 45 in FIG. 4.

Figure 6:
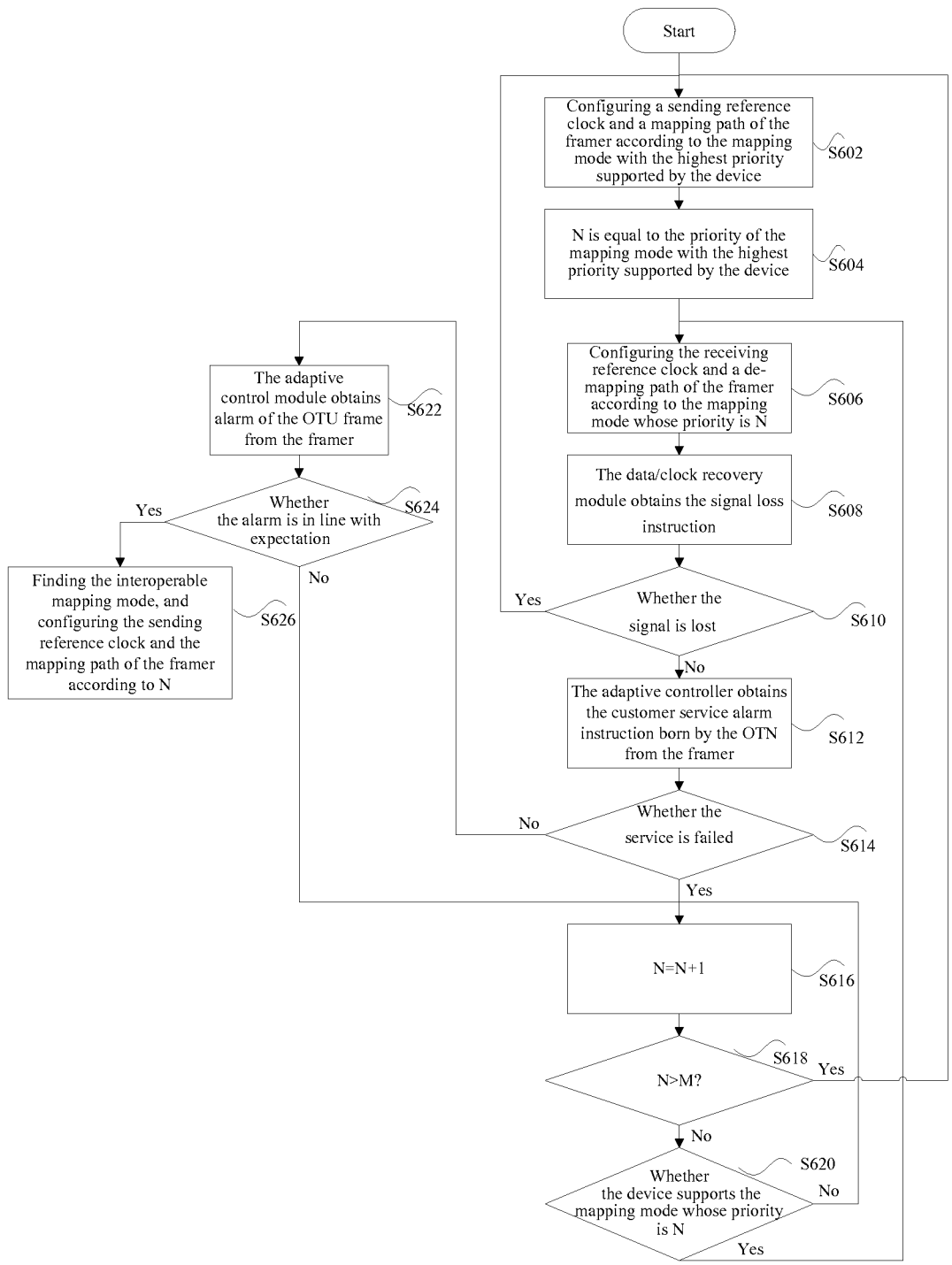
FIG. 6 is a flowchart according to a preferred embodiment of the disclosure.

FIG. 6 is a flowchart according to a preferred embodiment of the disclosure. The embodiment is described below with reference to the structure described in FIG. 4.

Step S602: a sending reference clock and a mapping path of a framer are configured according to a mapping mode with the highest priority supported by a device. The sending reference clocks in four different mapping modes are shown in Table 1. The mapping paths are paths of mapping 10GE to OTU2/OTU2e/OTU1e. The description of four mapping paths is shown in Table 1.

TABLE 1

Reference table of sending reference clock rates in four mapping modes

| Priority | Mapping mode | Sending/receiving reference clock rate |
|---|---|---|
| 1 | 10GE->GFP->OTU2 non-pass-through preamble | 10.7092 GHz |
| 2 | 10GE->GFP->OTU2 pass-through preamble | 10.7092 GHz |
| 3 | 10GE-> OTU2e | 11.0957 GHz |
| 4 | 10GE ->OTU1e | 11.0491 GHz |

Step S604: the priority of the mapping mode with the highest priority supported by the equipment is obtained, and it is stored in a variable N.

Step S606: the receiving reference clock and a de-mapping path of the framer is configured according to the mapping mode whose priority is N. The receiving reference clock can refer to Table 2, the description of de-mapping path of the framer can refer to Table 2, and the process is reverse.

TABLE 2

Reference table of the description of mapping paths in four mapping modes

| Priority | Mapping mode | Description of mapping path |
|---|---|---|
| 1 | 10GE->GFP->OTU2 non-pass-through preamble | Removing inter-packet gap, preamble, frame start delimiter of 10GE signal, mapping the 10GE signal into GFP frame, and then mapping it into payload OPU2 of the OTU2 frame in the mode of GFP-F |
| 2 | 10GE->GFP->OTU2 pass-through preamble | Removing inter-packet gap of 10GE signal, taking 3 reserved bytes of OPU2 when mapping the 10GE signal into GFP frame, and then mapping it into payload OPU2 of the OTU2 frame in the mode of GFP-F |
| 3 | 10GE->OTU2e | Directly synchronously mapping the 10GE signal into payload OPU2 of the OTU2 frame, the fixed padding bytes are reserved |
| 4 | 10GE->OTU1e | Directly synchronously mapping the 10GE signal into payload OPU2 of the OTU2 frame, the fixed padding bytes are not reserved |

Step S608: the adaptive control module obtains the signal loss instruction from the data/clock recovery module. If the signal is lost, returning to Step 602, otherwise, entering Step S612.

Step S610: It is judged whether the signal is lost.

Step S612: the adaptive control module obtains an alarm of the OTU frame from the framer. If there is the service failure alarm in the OTU, entering Step S616, otherwise, entering Step S622.

Step S614: it is judged whether service is failed.

Step S616: the value of N is added by 1.

Step S618: if N is greater than M, it indicated that the local device and the opposite device do not have the mapping mode supported by both of them, and returning to Step S602; otherwise, entering Step S620. M is the sum of methods for mapping the customer service signal into the OTU frame.

Step S620: if the device supports the mapping mode whose priority is N, returning to Step S606, otherwise, returning to step S616.

Step S622: the adaptive controller obtains the GFP alarm instruction of customer service born by the OTN from the framer.

Step S624: it is judged whether the alarm is in line with expectation, if the judgment result is yes, entering Step S626, otherwise, entering Step S616.

Step S626: the interoperable mapping mode is found, and the sending reference clock and the mapping path of the framer are configured according to N.

TABLE 3

Reference table of expected alarm states of client layer of the OTU frame

| Priority | Mapping mode | Expected alarm states of client layer of the OTU frame |
|---|---|---|
| 1 | 10GE->GFP->OTU2 non-pass-through preamble | GFP client signal failure or no GFP alarm |
| 2 | 10GE->GFP->OTU2 pass-through preamble | GFP client signal failure or no GFP alarm |
| 3 | 10GE-> OTU2e | 10GE signal G-AIS alarm or no alarm |
| 4 | 10GE-> OTU1e | 10GE signal G-AIS alarm or no alarm |

Figure 7:
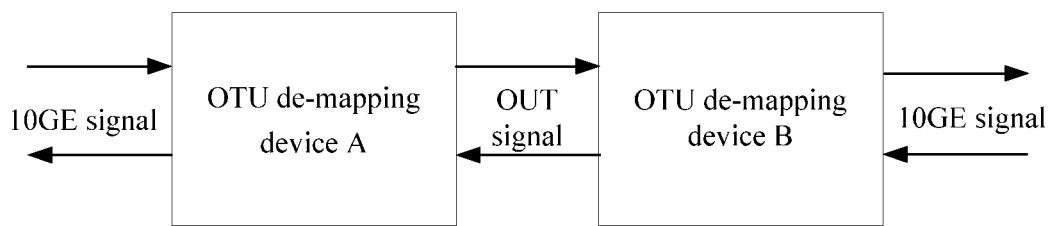
FIG. 7 is a schematic diagram according to a preferred embodiment of the disclosure.

It should be noted that, the steps shown in the flowchart of the accompany drawings can be executed in the computer system of a group of computer-executable instructions; besides, although the logical order is shown in the flowchart, in some cases, the presented or described steps can be executed in an order different from that described here The disclosure further provides a preferred embodiment, which combines the technical solutions of afore-mentioned multiple preferred embodiments; the preferred embodiment is described below with reference to FIG. 7 in detail.

The embodiment takes accessing 10GE service for example. Both the device A and the device B are the de-mapping device for an OTU frame. The device A supports the four mapping modes shown in Table 1, and the device B supports the mapping modes whose priorities are respectively 3 and 4 shown in Table 2. The device A and the device B are connected through optical fiber. After the device is powered on, the device A sets the sending reference clock as 10.7092 GHz, and sets the mapping mode as 10GE->GFP->OTU2 non-pass-through preamble, the device B sets the sending reference clock as 11.0957 GHz, and sets the mapping mode as 10GE->GFP->OTU2 non-pass-through preamble. After the optical fiber is connected, both the device A and the device B detect that the signal loss alarm disappears, the device A sets its sending reference clock and de-mapping path in order from the priority 1 according to the order of priority, and the device B sets its sending reference clock and de-mapping path in order from the priority 3 according to the order of priority. When the device A sets the receiving reference clock and the de-mapping path with priority of 3, the OTU layer alarm disappears, and the GFP layer alarm is in line with expectation (if the client-side port of the device B does not access the 10GE service at this point, the device A detects that the GFP customer signal is failed; otherwise, the device A detects no GFP alarm). The device A configures the receiving reference clock and the de-mapping path as the mode whose priority is 3, and maintains it. When the device B sets the receiving reference clock and the de-mapping path with priority of 3, the OTU layer alarm disappears, the GFP layer alarm is in line with expectation (if the client-side port of the equipment A does not access the 10GE service at this point, the equipment B detects that the GFP customer signal is failed; otherwise, the equipment A detects no GFP alarm). With this, the adaptive process is ended, and both devices automatically find the 10GE signal mapping mode supported by both of them.

The above embodiments can automatically identify the mapping mode supported by all the OTN devices which are interconnected and access the same customer service signal on the premise of not accounting for overhead, and realize automatic configuration; besides, the disclosure supports automatic identification and automatic configuration between devices as well as automatic identification and automatic configuration between the device to which the disclosure belongs and the non-automatically identifying old device. The disclosure greatly facilitates interconnection operation when the operator accesses the customer signal with multiple modes of mapping into the OTU frame, so it has great practical value.

It should be noted that, the de-mapping device for OTU frame described in the embodiment of device corresponds to the embodiment of method, and its specific implementation process has been described in the embodiment of method in detail, so it will not be repeated here.

In conclusion, the method capable of adaptively configuring the customer service mapping mode of the disclosure enables the devices which support one or more mapping modes from a certain customer signal to the OTN to automatically find the de-mapping mode which is interoperable for both devices. An OTN device bearing a certain customer signal can possess the function of customer signal de-mapping adaptation in the OTN by only updating software on condition of not changing hardware.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A de-mapping method for an Optical Transport Unit (OTU) frame, comprising:
    setting a receiving reference clock and a de-mapping path according to a highest priority of an OTU frame mapping mode of a local device;
    receiving an OTU frame of an opposite device by using the receiving reference clock and the de-mapping path;
    determining a de-mapping priority of the OTU frame according to a clock recovery result of the received OTU frame and a customer service alarm instruction configured to judge whether data is received correctly,
    wherein the step of determining further comprises judging whether the clock recovery result of the OTU frame is signal loss; and if the judgment result is no, obtaining the customer service alarm instruction of the OTU frame;
    wherein the step of determining further comprises if the customer service alarm instruction is a service failure alarm, increasing the de-mapping priority of the OTU frame by a level, and performing a clock recovery procedure according to a receiving reference clock corresponding to a de-mapping priority of the OTU frame which is increased by a level, and if the customer service alarm instruction is an expected alarm state of a client layer, determining that the current priority is the de-mapping priority of the OTU frame; and
    de-mapping the OTU frame of the opposite device by using a receiving reference clock and a de-mapping path corresponding to the determined de-mapping priority of the OTU frame.

2. The method according to claim 1, wherein after the step of determining the de-mapping priority of the OTU frame according to the clock recovery result of the received OTU frame and the customer service alarm instruction, the method further comprises:
    adjusting the priority of the OTU frame mapping mode of the local device as the determined de-mapping priority of the OTU frame.

3. The method according to claim 1, wherein if the de-mapping priority of the OTU frame is greater than the sum of the mapping priority of the OTU frame, reperforming the de-mapping process.

4. A de-mapping device for an Optical Transport Unit (OTU) frame, comprising:
    a setting module, configured to set a receiving reference clock and a de-mapping path according to a highest priority of an OTU frame mapping mode of a local device;
    a receiving module, configured to receive an OTU frame of an opposite device by using the receiving reference clock and the de-mapping path;
    a determining module, configured to determine a de-mapping priority of the OTU frame according to a clock recovery result of the received OTU frame and a customer service alarm instruction configured to judge whether data is received correctly,
    wherein the determining module comprises:
        a judging module, configured to judge whether the clock recovery result of the OTU frame is signal loss;
        an obtaining module, configured to obtain the customer service alarm instruction of the OTU frame in the situation that the judgment result is no;
        a priority increasing module, configured to, if the customer service alarm instruction is a service failure alarm, increase the de-mapping priority of the OTU frame by a level; and
        a priority determining module, configured to, if the customer service alarm instruction is an expected alarm state of a client layer, determine that the current priority is the de-mapping priority of the OTU frame; and
    a de-mapping module, configured to de-map the OTU frame of the opposite device by using a receiving reference clock and a de-mapping path corresponding to the determined de-mapping priority of the OTU frame.

5. The device according to claim 4, wherein the device further comprises:
    an adjusting module, configured to adjust the priority of the OTU frame mapping mode of the local device as the determined de-mapping priority of the OTU frame.

6. The device according to claim 4, wherein if the de-mapping priority of the OTU frame is greater than the sum of the mapping priority of the OTU frame, reperforming the de-mapping process.

* * * * *